June 8, 1965  J. W. LUCAS  3,187,656
PRINTING ADAPTER FOR FILM-LOADING DEVICES
Filed May 29, 1962
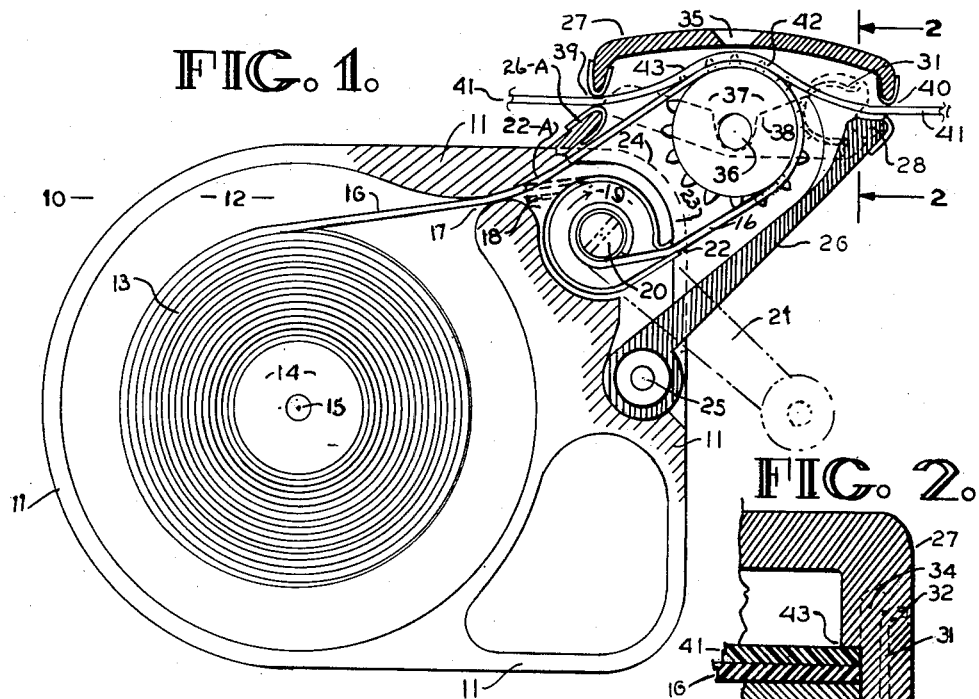
FIG. 1.
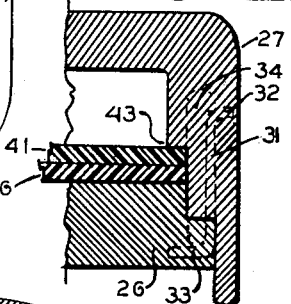
FIG. 2.
FIG. 3.
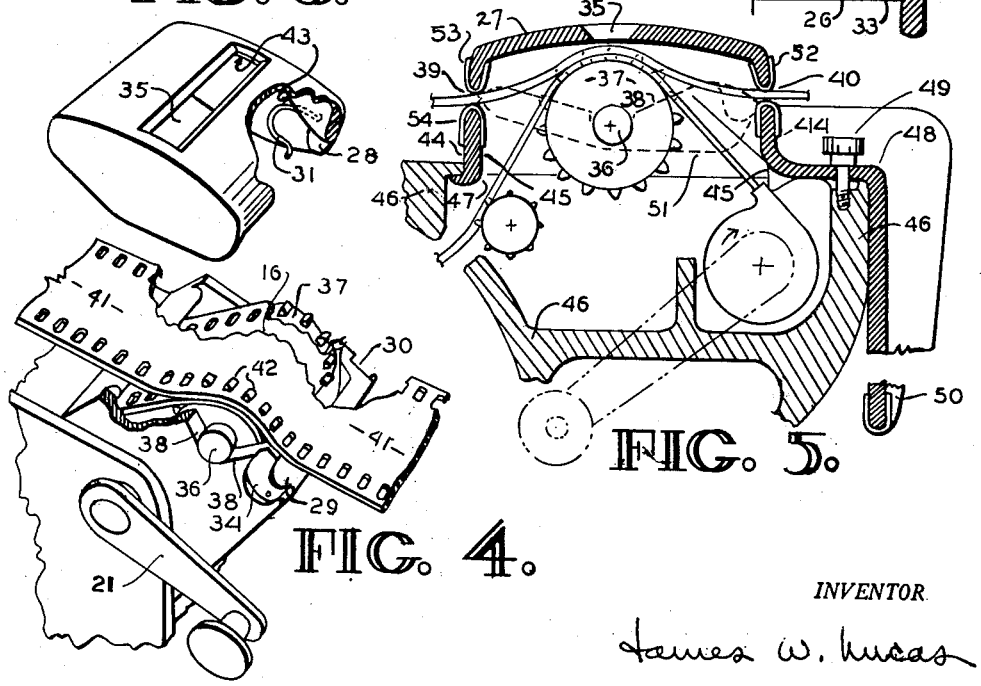
FIG. 5.
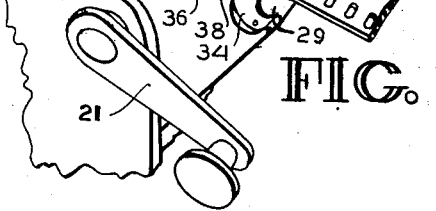
FIG. 4.
INVENTOR
James W. Lucas

United States Patent Office 3,187,656
Patented June 8, 1965

3,187,656
PRINTING ADAPTER FOR FILM-LOADING DEVICES
James W. Lucas, 1480 N. Doheny Drive,
Los Angeles 69, Calif.
Filed May 29, 1962, Ser. No. 203,677
4 Claims. (Cl. 95—75)

The present invention relates to devices for loading film from a large roll of bulk film into individual casettes for use in cameras, and to devices for making photographic prints from negative film strips, and more particularly to an adapter device which is readily attachable to presently available film loading devices and through the addition of which they may be used for making continuous prints of complete film strip negatives or single prints of individual pictures selected therefrom.

A number of film loading devices are available for use in loading bulk film in daylight into individual magazines or casettes used in cameras. Also, a number of printing devices with which the photographer may make his own prints from 35 mm. negative film strips are in use, but none may be used in daylight. Each of these devices is now built for one purpose only, and because of its structural conformation cannot be utilized for both purposes.

The present invention has been made with the foregoing consideration in mind, and may be said to have several important objects.

One important object of my present invention is the provision of an adapter device being attachable to existing film loading devices and providing means for making prints of negative film strips therewith in daylight.

Another important object of my invention is the provision of a device of the character described which when attached to a conventional film loader will enable the printing of selected portions of a strip of negative film.

A further important object of my present invention is the provision of a printing adapter of the character described which is adaptable in basal conformation so as to interfit with any of a plurality of different openings in presently available loading devices.

An additional object of my present invention is the provision of an adapter device of the character described and being attachable to and removable from a film loader without exposure of the roll of bulk film stored therein.

For a better understanding of my invention it should be pointed out that a film loading device includes simply a light tight casing provided internally with a large and a small cylindrical chamber connected by a neck, and having a removable side cover on one side and a pivotally attached or removable small lid providing access to the small chamber. Removal of the side cover affords access to both chambers and the neck so that a roll of bulk film may be inserted in the large chamber and threaded through the neck, then the side cover repositioned. Thus, even in daylight the small lid may be opened or removed, the end of the bulk film connected with the spool of the casette, and the casette inserted in the small chamber where it is engaged by the end of a crank with which the film is wound from the large roll into the casette.

In brief, the device of my invention consists of a printing adapter which may be added to an existing film loading device, and includes an extended throat portion having a centrally apertured cover hinged thereto, and a sprocket member journalled to rotate immediately below the light-admitting aperture in the center of the hinged cover and intermediate of parallel slits in opposite sides of the hinged cover. The bottom of the throat portion is adapted with different configurations so as to interfit within the opening normally closed by the removable small lid of the film loader.

When a roll of positive film is loaded in the large compartment of a film loading device and threaded over the sprocket of the adapter into the casette, and a negative film strip is entered through one slit then over the sprocket and out the second slit, rotation of the crank to wind positive film into the casette is also effective to move the negative film simultaneously with the positive film beneath the light-admitting aperture in the hinged cover of the printing adapter.

Certain variations in the embodiment described above and additional objects of my invention will become apparent upon examination of the following detailed specification and the references made therein to the accompanying drawings, of which:

FIGURE 1 is a side elevational diagrammatic view, partially in section, of a conventional loading device having a printing adapter of my invention attached thereto;

FIGURE 2 is a vertical sectional view taken along the line and in the direction indicated by the arrows 2—2 in FIGURE 1, showing the pivotal articulation between the hinged cover and throat sections of the adapter;

FIGURE 3 is a diagrammatic view in perspective showing the hinged cover of the adapter with a portion of the sidewall broken away to show the position of the interfitting parts therein;

FIGURE 4 is a diagrammatic perspective view showing the upper end of the throat portion of the adapter with the sprocket journalled therein and portions of film positioned over the sprocket;

FIGURE 5 is a diagrammatic sectional view showing a printing adapter of my invention fitted with a basal portion of suitable conformation to interfit with a different type of film loader from that shown in FIGURE 1.

Reference is again made to FIGURE 1 in which the numeral 10 designates generally the main body casing of a film loading device of generally conventional character as it would appear with its side cover removed revealing the structural wall 11 interiorly of which is the large chamber 12 having a roll of positive film 13 disposed therein on the hub 14 and supporting spindle 15. The outer end of the film 16 is seen to be threaded through the neck portion 17 and into the small chamber 18 in which a casette 19 having a film winding spool therein is disposed with the core end 20 of the spool being interfittingly engageable with the crank member 21.

When used in the conventional manner as a film loading device, the opening 22 of the casette 19 is normally positioned as indicated by the broken lines at 22–A and the film 16 is wound directly therein by rotation of the crank 21, and light is excluded from the chamber during the winding process by the small lid 23 which is normally disposed in the closed position indicated by the broken lines at 24. However, as shown in FIGURE 1, the small lid 23 has been removed from its pivotal journal point 25 and the adapter device of my invention, which may be readily distinguished by the heavier shading of the sectional areas, has been installed in its place so as to completely enclose the small chamber 18 and still provide access thereto.

Structurally the adapter device includes a diagonally extended throat portion seen at 26 and 26–A being conformed to utilize the attachment means present in the case including the pivotal journal means 25 and the end edge of the throat portion 26–A which is conformed to interfit with the top 11 of the case 10. Laterally between the section 26 and 26–A, the sides of the throat section are terminated upwardly along the broken line designated as 38 in FIGURES 1 and 4.

A hinged cover member 27 is pivotally attached to the top of the throat section by means of boss members 28 seen in FIGURES 1 and 3 which are adapted for arcuate movement within slots in the upper edge of the throat portion as shown at 29 and 30 and best seen in FIGURE 4. Each of a pair of arcuately conformed springs such as 31 is provided with oppositely bent ends 32 and 33 in FIGURE 2, the end 32 being received in a shallow bore in the top 27 and the oppositely bent end 33 being received in a bore in the throat portion 26, and a pair of cavities such as that indicated by the broken line at 34 in the sectional view of FIGURE 2 and seen in the perspective view of FIGURE 4 in which the springs 31 may move as the cover 27 is rotated upwardly and outwardly.

Shown in FIGURES 1, 3 and 5 is the generally rectangular aperture 35 disposed in the center of the top of the hinged cover 27, and a sprocket member 37 having spaced circumferential rows of teeth 42 adapted to engage the perforations in motion picture film is disposed on a shaft 36 which is journalled within circular notches at 38 in the upper edges of the throat section.

Integrally conformed with the hinged cover 27 are opposite offset portions such as 43 in the inner sidewalls of the hinged cover. These determine the path of movement of the negative film 41 beneath the cover and serve to hold it down against the positive film 16 in tight engagement with the teeth 42 of the sprocket 37. The offset 43 follows the line of the upper edge of the film 41 in FIGURE 1, and is also clearly shown in section in FIGURE 2 and in the perspective view of FIGURE 3.

When making prints from negative film strips with a conventional film loading device and an adapter of my invention, the small lid of the loader indicated at 23 in FIGURE 1, is removed as has been explained, and the adapter is installed in its place utilizing the same pivotal attachment means at 25. A bulk roll of positive film 13 is then positioned in the large chamber 12 of the loading device 10 and threaded through the neck 17 of the loader and the throat 26 of the adapter, then over the sprocket 37 and thence into the casette 19.

During tests with prototypes of the device it was actually found most convenient to thread the film end into the casette and install the casette in its normal position, then form a loop of the film and insert it upwardly through the throat section, finally slipping the sprocket into the journal notches interiorly of the loop of film.

The strip of negative film 41 to be printed is threaded through the slits 39 and 40 provided in the hinged cover, over the sprocket 37 above the positive film 16 under the light-admitting aperture 35. And, as the positive film 16 is wound by means of the crank 21 into the casette 19, the negative film 41 which is also engaged by the teeth 42 of the sprocket 37 is drawn past the light-admitting aperture 35 simultaneously and while in close contact with the positive film 16. As will be understood, the printing operation just described may be performed in daylight if desired.

When making prints of single picture sections selected from the series on a negative film strip, it is more convenient to work in a darkroom with an artificial printing light which can be extinguished and a safelight used while the cover is raised and the negative lifted from engagement with the teeth of the sprocket and moved to the next picture section to be printed. The last section of exposed positive film is wound into the casette, then the hinged cover may be opened and the casette removed in daylight if desired, for shipment to a laboratory for development.

The manner in which the device of my invention is adapted for use with another presently available film loading device is shown in FIGURE 5 in which it is seen to have similarly conformed spaced sides 44, but to be provided with differently conformed attachment means interfitting within the aperture 45 of the differently conformed casing 46. The attachment means adjoining the throat portion 44 is seen to include the underfitting at 47 and a downwardly extended bracket member 48 which is attached by the threaded bolt member 49 to the structure 46 of the film loader. The fragmentary portion seen at 50 of the bracket 48 is adapted to engage a work surface in line with the lowest portion of the case of the loader 46 so as to support the loading device and printing adapter attached thereto in the substantially horizontal position indicated in FIGURE 5.

The other elements of the adapter are designated by the same numerals used in the foregoing description relative to FIGURES 1 to 4, and the lines of division between the parts and the structure of the loader and the adapter is indicated by the different sectional shading and by the broken line at 51 which shows the bottom of the cover 27 and the line 52 indicating the top of the throat portion 44. The slits 39 and 40 are also seen to be provided with fabric liners such as 53 and 54 which serve to exclude light from the small chamber when film is not threaded therethrough.

Although in order to comply with the statute the present invention has been described in considerable detail in the form of one main embodiment, it is to be understood that these details are subject to change and variation and the embodiment is open to substantial modification, and the invention itself is amenable to adaptation into a plurality of embodiments and therefore is not to be restricted to the particular form described and shown herein nor limited in any manner except as may be indicated by the extent and scope of the following claims.

What I claim as my invention is:

1. The combination comprising: a generally conventional film-loading device including a light tight casing having interiorly thereof a large and a small chamber with an intercommunicating neck therebetween, detachable side cover means forming one side of said casing, an access aperture through the walls of said casing opening into said small chamber and attachment means for mounting a small lid thereover, means for supporting a casette having therein a film winding spool interiorly of said small chamber and crank means enterable through said side cover and being adapted to rotate said spool; and a film printing adapter having a basal portion adapted to interfit within said access aperture opening into said small chamber and being engageable with said lid attachment means adjacent thereto, a throat section extended outwardly from said basal portion and having semi-circular axially aligned grooves disposed inwardly from the outwardly extended edges of two opposite sides thereof, sprocket means being journalled rotatably in said grooves, and movable, cover means adjacent said throat section, said cover having a central aperture therein adapted to admit light therethrough above said sprocket, and a pair of film-receiving slots disposed in spaced sides of said throat section parallel to the rotational axis of said sprocket.

2. The combination of a film-loader and a printing adapter as set forth in claim 1 being further characterized by said aperture in said movable cover of said printing adapter being adapted to admit a band of light directly above said sprocket and in parallel alignment with the axis thereof.

3. In combination, a film-loading device and a printing adapter in accordance with claim 2 and further characterized by said printing adapter being quickly detachable from said film-loader casing, whereby said small lid of said film-loader is readily re-attachable to said casing to exclude light from said small chamber thereby enabling the use of the device for loading film casettes in daylight.

4. A printing adapter device being attachable to an existing film-loading device, comprising: a generally rigid throat section being adapted for the passage of photographic film therethrough, said throat section being normally positioned vertically in space and being open at its top and bottom; idler means comprising a sprocket member having spaced circumferential rows of radially disposed teeth adapted in circumferential spacing to engage the perforations in motion picture film and adapted in length to engage at least two thicknesses of film, an axial shaft extending outwardly from each end of said sprocket, and a pair of semi-circular notches disposed centrally in the upper edges of opposite sides of said throat portion, said notches being adapted to receive said extended shafts therein, thereby supporting said sprocket member rotatably and removably between said opposite sides of said throat portion, and being effective to support positive and negative films interiorly of said throat section and guide them therethrough; hinged cover means comprising a pair of arcuate boss members extended inwardly from each side of said cover adjacent one end thereof; a pair of arcuate recesses disposed downwardly from opposite upper edges of said throat section, said recesses being adapted to receive said bosses, and a pair of generally circular wire springs terminated in oppositely extended ends, one end of each interfitting within a bore in said cover and the other end in a bore in the sidewall of said recess whereby said cover is selectively positionable and held in the open or closed position, said hinged cover having an aperture therein adapted to admit light immediately above said idler means; said bottom of said throat section being adapted in conformation to interfit within the aperture opening outwardly from the small interior chamber of said existing film-loading device, and having interfitting means of attachment therewith, a pair of slit-like apertures disposed parallel to the axis of said sprocket member and in endwise transverse alignment therewith, said apertures opening outwardly through opposite sides of said throat portion and being disposed between said throat portion and said cover when the latter is closed thereon.

References Cited by the Examiner
UNITED STATES PATENTS

| | | | |
|---|---|---|---|
| 2,153,214 | 4/39 | Tondreau | 95—75 |
| 2,158,001 | 5/39 | Dazey | 95—75 |
| 2,742,838 | 4/56 | Paulas | 95—89 |

NORTON ANSHER, *Primary Examiner.*

JOHN M. HORAN, *Examiner.*